No. 833,579. PATENTED OCT. 16, 1906.
P. P. CHMELEFF.
ASSORTER AND WASHER FOR SAND AND GRAVEL.
APPLICATION FILED MAR. 6, 1905.
2 SHEETS—SHEET 2.
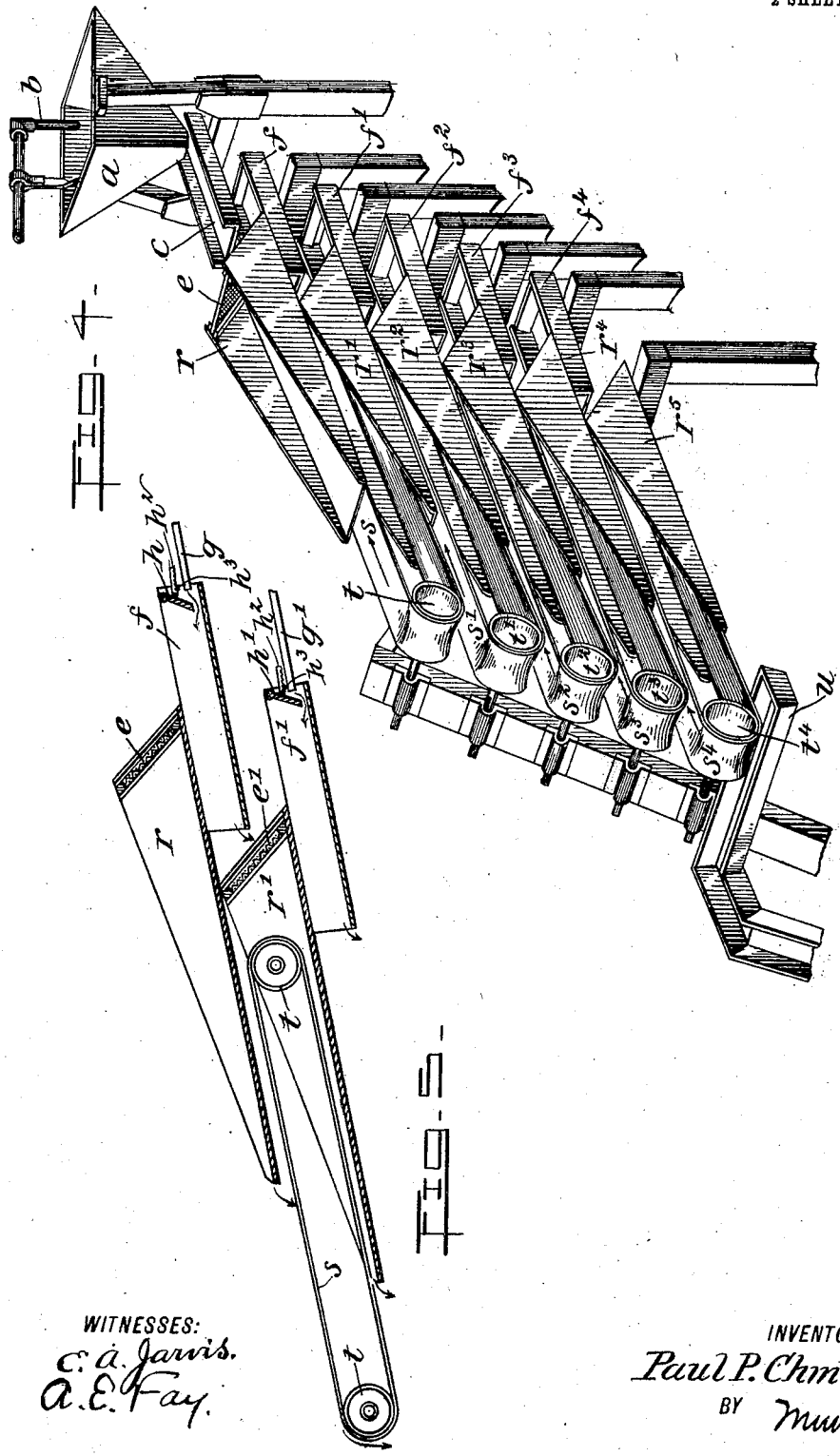
WITNESSES:
C. A. Jarvis.
A. E. Fay.
INVENTOR
Paul P. Chmeleff
BY
ATTORNEYS

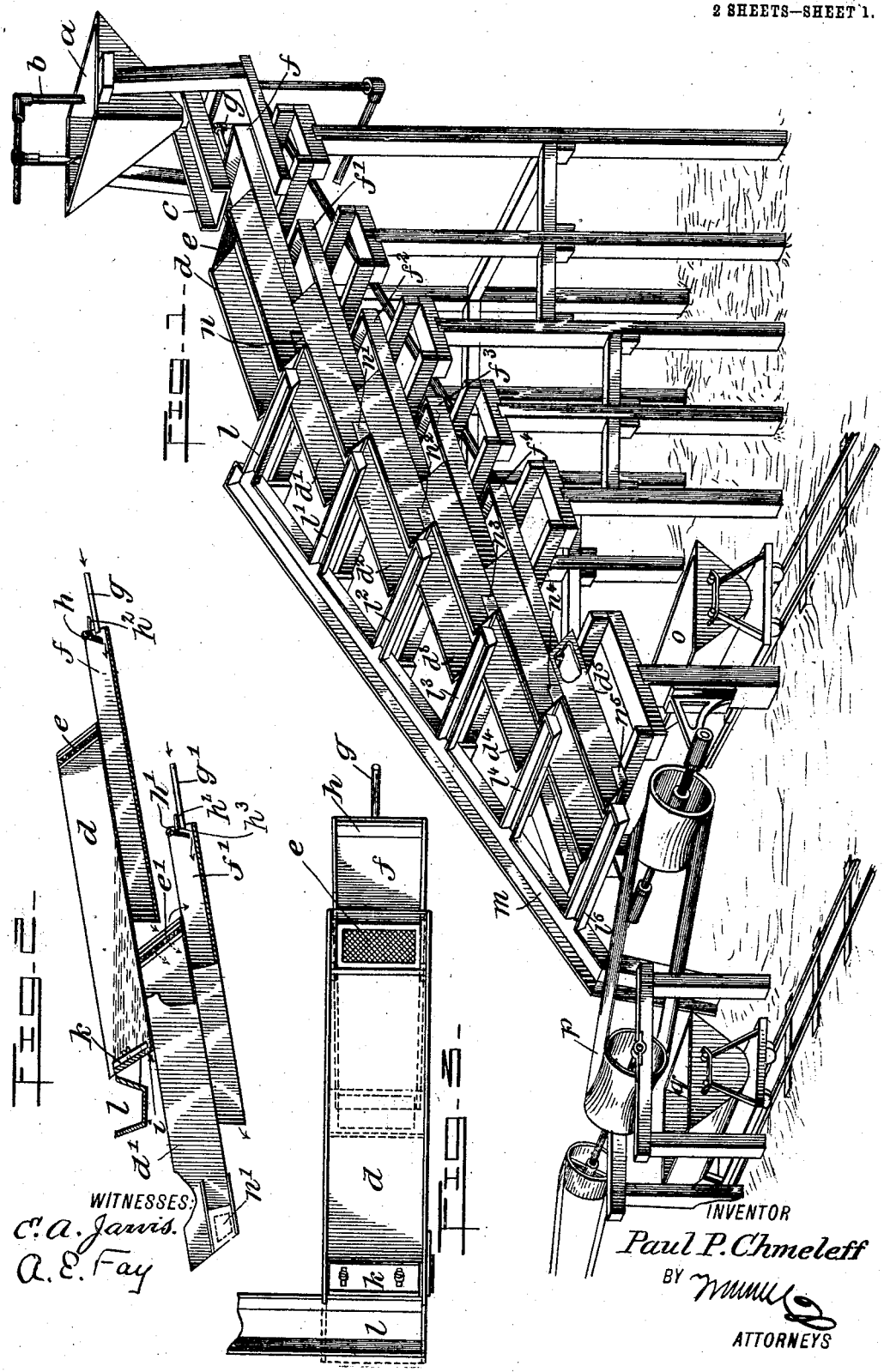

UNITED STATES PATENT OFFICE.

PAUL P. CHMELEFF, OF MOSCOW, RUSSIA.

ASSORTER AND WASHER FOR SAND AND GRAVEL.

No. 833,579.     Specification of Letters Patent.     Patented Oct. 16, 1906.

Application filed March 6, 1905. Serial No. 248,473.

To all whom it may concern:

Be it known that I, PAUL P. CHMELEFF, a subject of the Czar of Russia, and a resident of Moscow, Russia, have invented a new and Improved Assorter and Washer for Sand and Gravel, of which the following is a full, clear, and exact description.

My invention relates to apparatus for washing, sifting, and assorting sand used for filling water-filters, for concrete-works and the like, and also for gravel and other granular materials of all kinds.

The objects of my invention are to provide an apparatus for accomplishing the results stated in a more efficient manner than has heretofore been done.

Further objects of my invention are to separate sand from gravel and to thoroughly clean all kinds of granular material from dust and fine particles.

Reference is to be had to the accompanying drawings, forming a part of this specification, in which similar characters of reference indicate corresponding parts in all the figures.

Figure 1 is a perspective view of a preferred form of my apparatus. Fig. 2 is a longitudinal sectional view of certain portions thereof. Fig. 3 is a plan view of certain portions of the apparatus. Fig. 4 is a perspective view of another form of my invention, and Fig. 5 is a sectional view of certain portions of the same.

In Figs. 1, 2, and 3 of the drawings, $a$ represents a hopper of any ordinary kind for feeding granular material to the apparatus, and it is provided with a pipe $b$ for the introduction of water. $c$ is a chute leading from the hopper to the apparatus. $d$, $d'$, $d^2$, $d^3$, $d^4$, and $d^5$ represent a series of receptacles, preferably placed in the relation shown, inclined from the horizontal and each one placed with its front end above the rear end of the one below. The receptacles are provided with screens $e$ $e'$, &c., at the rear ends and provided at the front ends with openings $i$, which may be closed by means of sliding gates $k$. Side doors $n$, $n'$, $n^2$, $n^3$, $n^4$, and $n^5$ are also provided for the purpose of removing material deposited in the receptacles. Upon the front ends of the receptacles are secured troughs $l$ $l'$ $l^2$ $l^3$ $l^4$ $l^5$ for receiving overflow from the receptacles, said troughs being connected by a waste-chute $m$, as shown. Below the receptacles are placed troughs $f f' f^2 f^3$ $f^4$, provided with pipes $g$ $g'$, &c., for the introduction of water, and with adjustable boards $h$ $h'$, &c. The boards $h$ $h'$ are hinged, and to them are secured the notched bars $h^2$, adapted to engage pins $h^3$ to permit the said boards to be placed at an angle, as shown, for the purpose of distributing the water from the pipes throughout the bottoms of the troughs. These troughs are placed along the bottoms of the receptacles and inclined in the same manner. The arrangement of these devices is such that upon the introduction of sand or other granular material into the hopper $a$ and the simultaneous introduction of water through the pipe $b$ the material will flow down the chute $c$ against the screen $e$ and will thereupon be divided, part going through the screen into the receptacle $d$ and flowing from there through the opening $i$ into the receptacle $d'$ below, and so on. The water will go with this part of the granular material, and the lighter and dirty parts will tend to float upon the top of the water and will in a large measure be carried over into the waste-troughs and discharge from the apparatus through the chute $m$. Other parts of the same portion of the granular material and the water will flow into the receptacle $d'$ and go through the same process in the receptacles $d^2$, $d^3$, $d^4$, and $d^5$ and will be discharged at the bottom upon the conveyer $p$ in a thoroughly-cleaned condition, whence it will be transported into a car $q$ or any other receptacle placed at the end of the conveyer.

Instead of dropping the material into the conveyer $p$ it may be dropped into a car or other receptacle below the bottom receptacle.

The coarser parts of the material deposited from the chute $c$ will run down the screen $e$ into the trough $f$ and there be acted upon by an additional quantity of water introduced through the pipe $g$ and spread by the board $h$. This material will be forced against the screen $e'$, and the water, with most of that part of the material which is fine enough to pass through the screen, will pass into the receptacle $d'$ and go through the process described above. The coarser parts will drop into the trough $f'$ and being acted upon again by fresh water introduced at $g'$ will be caused to pass through the same series of operations. Instead of dropping the material onto the conveyer $p$ it may be dropped into a car or other receptacle $o$ below the bottom receptacle, as shown.

It will be noticed that this apparatus operates by first separating the very fine sand from the gravel and at the same time washing it and proceeding continuously to separate the finest sand in the mixture, gradually proceeding toward the coarse gravel. In this manner the retaining of the coarse gravel in the mixture is an important feature, as by dropping upon the screens it agitates them and enables me to conduct the separating operations throughout without employing mechanism for agitating the screens. This is an important saving and results from the fact that I proceed in a reverse manner to what is usually done in an apparatus of this character.

In Figs. 4 and 5 I have shown another form of this apparatus in which the parts $a$, $b$, $c$, $e$, $f$, $h$, $g$, $e'$, $h'$, $g'$, $f'$, $f^2$, $f^3$, and $f^4$ are the same as those described above. Instead of the receptacles shown in the other figures, however, I provide in this modification a series of triangular-shaped receptacles $r$ $r'$ $r^2$ $r^3$ $r^4$ $r^5$, mounted in a similar manner to the receptacles shown in the other figures. Below the bottoms of these receptacles are endless belts $s$ $s'$ $s^2$ $s^3$ $s^4$, running on the pulleys $t$ $t'$ $t^2$ $t^3$ $t^4$ in such a manner as to convey the material dropping from the lower end of each receptacle back into the upper end of the receptacle below, the water, however, running off the lower ends of the belts and being discharged into the waste-trough $u$. The passage of the material back into the receptacles $r'$ $r^2$ $r^3$ $r^4$ $r^5$ will place it in a position to be acted upon by the water entering the troughs $f'$ $f^2$, $f^3$, and $f^4$ and cause it to be further cleaned and separated from fine materials.

The operation of the device is similar to that shown in the other figures and need not be described in detail.

By the use of my invention I am enabled to wash, approximately, three times as much sand as is done in the machines now on the market with the use of only about one-third or one-fourth the amount of water. The washing is thoroughly and quickly done and does not require hand manipulation during the process.

Having thus described my invention, I claim as new and desire to secure by Letters Patent—

1. In a device for washing granular material, the combination of a receptacle having a screen across one end, an overflow-trough and an outlet at the other end, means for closing said outlet, a trough below said receptacle having an open top for receiving material from said screen, and means for introducing water into said trough.

2. A device for washing and assorting granular material, comprising a series of inclined receptacles arranged one above another each with its front end overlapping and adapted to discharge into the rear end of the receptacle below, each receptacle being provided with a screen in the rear end back of the forward end of the receptacle below, and a series of troughs located below the receptacles, each having an open top and designed to receive coarse material intercepted by the screen in the receptacle above, and to discharge the material against the screen in the receptacle below.

3. The combination of a series of receptacles piled one above another, each one projecting over the rear end of the one below it, means for feeding material to the highest receptacle, a screen in each receptacle, each receptacle having an outlet permitting the material passing through the screen to proceed from the front end of the receptacle to the receptacle below, and a series of troughs arranged below said receptacles, each being adapted to receive the material intercepted by the screen in the receptacle above and discharge it into the receptacle below above the screen therein.

In testimony whereof I have signed my name to this specification in the presence of two subscribing witnesses.

PAUL P. CHMELEFF.

Witnesses:
PAUL N. BOCHAROFF,
ADOLF GROSCH.